(12) United States Patent
Kurian et al.

(10) Patent No.: US 9,912,605 B2
(45) Date of Patent: Mar. 6, 2018

(54) SYSTEM FOR PRIORITIZED RESOURCE ALLOCATION ACROSS A DISTRIBUTED PLATFORM

(71) Applicant: Bank of America Corporation, Charlotte, NC (US)

(72) Inventors: Manu Jacob Kurian, Dallas, TX (US); Paul Grayson Roscoe, Chester (GB)

(73) Assignee: BANK OF AMERICA CORPORATION, Charlotte, NC (US)

( * ) Notice: Subject to any disclaimer, the term of this patent is extended or adjusted under 35 U.S.C. 154(b) by 149 days.

(21) Appl. No.: 14/986,941

(22) Filed: Jan. 4, 2016

(65) Prior Publication Data

US 2017/0195246 A1    Jul. 6, 2017

(51) Int. Cl.
*H04L 12/911*    (2013.01)
*H04L 29/08*    (2006.01)

(52) U.S. Cl.
CPC ............. *H04L 47/70* (2013.01); *H04L 67/10* (2013.01)

(58) Field of Classification Search
CPC    H04L 41/0213; H04L 41/0896; H04L 41/147
See application file for complete search history.

(56) References Cited

U.S. PATENT DOCUMENTS

2002/0095400 A1*    7/2002    Johnson ................ H04L 41/147

\* cited by examiner

*Primary Examiner* — Ranodhi Serrao
(74) *Attorney, Agent, or Firm* — Michael A. Springs; Moore & Van Allen PLLC; James C. Edwards

(57) ABSTRACT

Embodiments of the invention are directed to systems, methods, and computer program products for utilizing dynamic trait compilation and recognition to respond to requests for finite resources associated with a distributed platform are allocated across the distributed platform in a prioritized manner.

14 Claims, 3 Drawing Sheets

SYSTEM FOR PRIORITIZED RESOURCE ALLOCATION ACROSS A DISTRIBUTED PLATFORM

FIELD

The present invention relates to utilizing dynamic trait compilation and recognition to allocate finite resources across a distributed platform in a prioritized manner.

BACKGROUND

The ability for a distributed platform to efficiently and effectively allocate resources amongst users can be impeded as the size and complexity of the platform increases. The potential for inefficiency in resource allocation can be compounded where individual users of the platform have multiple points of access with the platform, non-uniform expectations regarding the performance of the platform, and non-static resource requirements. As such, there is a need to improve how resources are allocated across a distributed platform.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

Generally, systems, computer program products, and methods are described herein for allocating resources across a distributed platform in a prioritized manner. In particular, example embodiments described herein address use of trait compilation and recognition, including dynamic trait compilation and recognition, to accomplish the prioritization and allocation of resources across a distributed service platform to meet the resource and/or service needs of users of the distributed service platform, such as customers of a business or institution.

According to embodiments of the invention, a system for allocating resources across a distributed platform is provided, the system comprising a memory device and a processing device operatively coupled to the memory device, wherein the processing device is configured to execute computer-readable program code to receive from a user a request for access to the distributed platform; access from the memory device a data record associated with the user; calculate a priority level associated with the request received from the user; allocate a first set of resources associated with the distributed platform to the user based at least in part on the calculated priority level; and transmit a first message associated with the user to the first set of resources associated with the distributed platform.

In some example implementations of such embodiments, the data record associated with the user comprises a first set of tags associated with the user, wherein the first set of tags comprises a first tag and a second tag, wherein the first tag is associated with a first aspect of a relationship between the user and the distributed platform and wherein the second tag is associated with a first aspect of the request received from the user for access to the distributed platform.

In some such example implementations and in other example implementations, calculating a priority level associated with the request received from the user comprises comparing the first set of tags associated with the user to a second set of tags associated with a second user who is associated with a second request for access to the distributed platform.

In some example implementations of such embodiments, the distributed platform is a distributed service platform, and the first set of resources associated with the distributed platform comprises a first individual associated with the distributed service platform. In some such example implementations, and in other implementations, the data record associated with the user comprises a third tag, wherein the third tag is associated with an identity of a second individual associated with the distributed service platform.

In some example implementations, transmitting a first message associated with the user to the first set of resources associated with the distributed platform comprises transmitting an indication of the identity of the user and a message associated with the data record to the first individual. In some such example implementations, and in other example implementations, the processing device is further configured to execute computer-readable program code to transmit a second message associated with the user to the second individual associated with the distributed service platform.

According to embodiments of the invention, a computer program product computer program product for allocating resources across a distributed platform is provided, the computer program product comprising at least one non-transitory computer-readable medium having computer-readable code portions embodied therein, the computer readable program code portions comprising an executable portion configured to receive from a user a request for access to the distributed platform; an executable portion configured to access from a memory device a data record associated with the user; an executable portion configured to calculate a priority level associated with the request received from the user; an executable portion configured to allocate a first set of resources associated with the distributed platform to the user based at least in part on the calculated priority level; and an executable portion configured to transmit a first message associated with the user to the first set of resources associated with the distributed platform.

In some example implementations of such embodiments, the data record associated with the user comprises a first set of tags associated with the user, wherein the first set of tags comprises a first tag and a second tag, wherein the first tag is associated with a first aspect of a relationship between the user and the distributed platform and wherein the second tag is associated with a first aspect of the request received from the user for access to the distributed platform.

In some such example implementations, and in other implementations, calculating a priority level associated with the request received from the user comprises comparing the first set of tags associated with the user to a second set of tags associated with a second user who is associated with a second request for access to the distributed platform.

In some example implementations, distributed platform is a distributed service platform, and the first set of resources associated with the distributed platform comprises a first individual associated with the distributed service platform. In some such example implementations, and in other example implementations, the data record associated with the user comprises a third tag, wherein the third tag is associated with an identity of a second individual associated with the distributed service platform.

In some example implementations, transmitting a first message associated with the user to the first set of resources associated with the distributed platform comprises transmitting an indication of the identity of the user and a message associated with the data record to the first individual. Moreover, some example implementation contemplate a computer program product that further comprises an executable portion configured to transmit a second message associated with the user to the second individual associated with the distributed service platform.

According to embodiments of the invention, a method for allocating resources across a distributed platform is provided, the method comprising: receiving from a user a request for access to the distributed platform; accessing from a memory device a data record associated with the user; calculating by a processing device a priority level associated with the request received from the user; allocating a first set of resources associated with the distributed platform to the user based at least in part on the calculated priority level; and transmitting a first message associated with the user to the first set of resources associated with the distributed platform.

In some example implementations of such embodiments, the data record associated with the user comprises a first set of tags associated with the user, wherein the first set of tags comprises a first tag and a second tag, wherein the first tag is associated with a first aspect of a relationship between the user and the distributed platform and wherein the second tag is associated with a first aspect of the request received from the user for access to the distributed platform.

In some such example implementations, and in other example implementations, calculating a priority level associated with the request received from the user comprises comparing the first set of tags associated with the user to a second set of tags associated with a second user who is associated with a second request for access to the distributed platform.

In some example implementations, the distributed platform is a distributed service platform, and wherein the first set of resources associated with the distributed platform comprises a first individual associated with the distributed service platform. In some such example implementations, and in other example implementations, the data record associated with the user comprises a third tag, wherein the third tag is associated with an identity of a second individual associated with the distributed service platform.

In some such example implementations, and in other example implementations, transmitting a first message associated with the user to the first set of resources associated with the distributed platform comprises transmitting an indication of the identity of the user and a message associated with the data record to the first individual. Moreover, in some implementations, the example method further comprises transmitting a second message associated with the user to the second individual associated with the distributed service platform.

To the accomplishment the foregoing and the related ends, the one or more embodiments comprise the features hereinafter described and particularly pointed out in the claims. The following description and the annexed drawings set forth certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
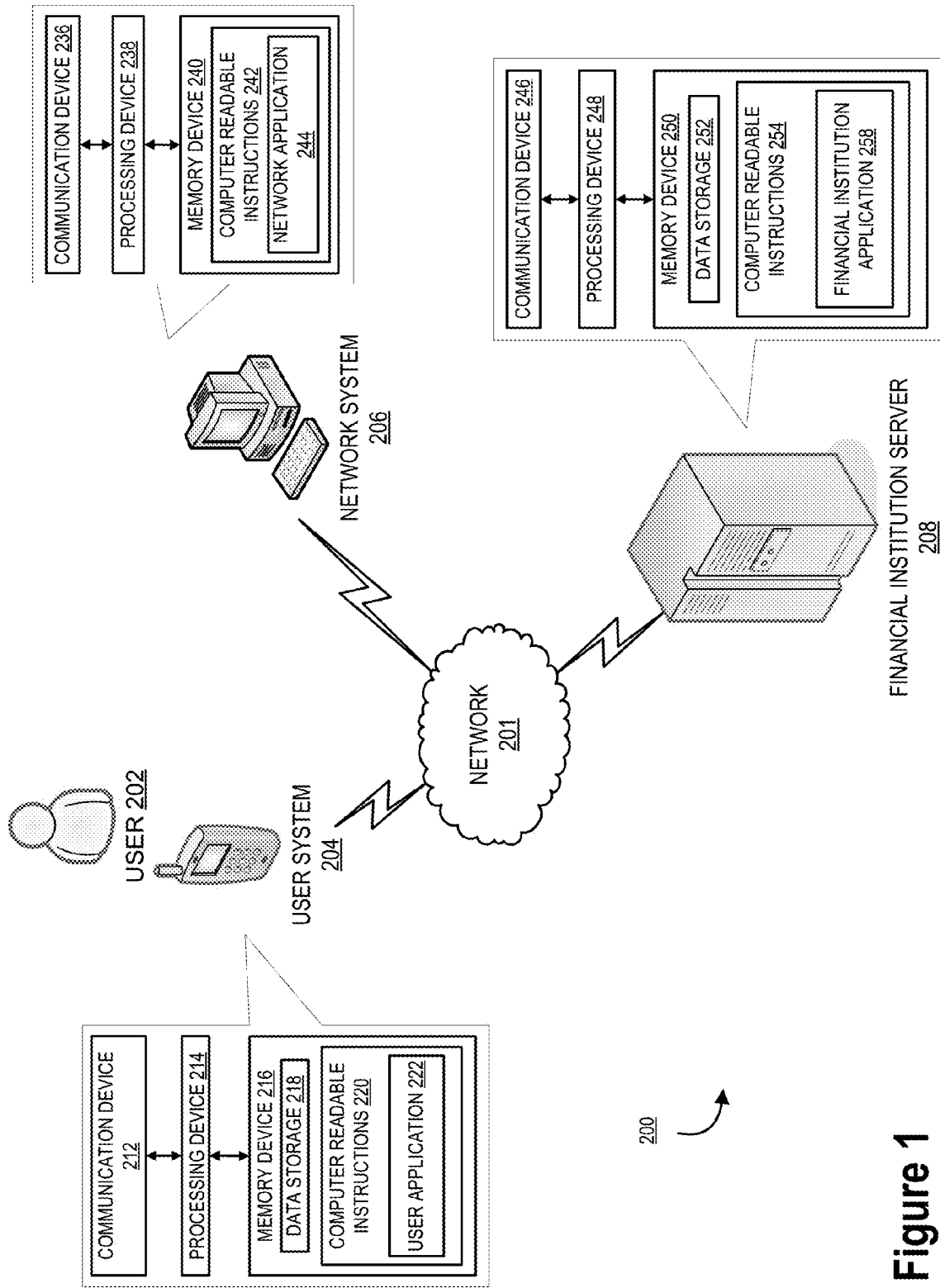

Having thus described embodiments of the invention in general terms, reference will now be made to the accompanying drawings, which are not necessarily drawn to scale, and wherein:

FIG. 1 illustrates a block diagram of a system environment, in accordance with embodiments of the invention.

Figure 2:
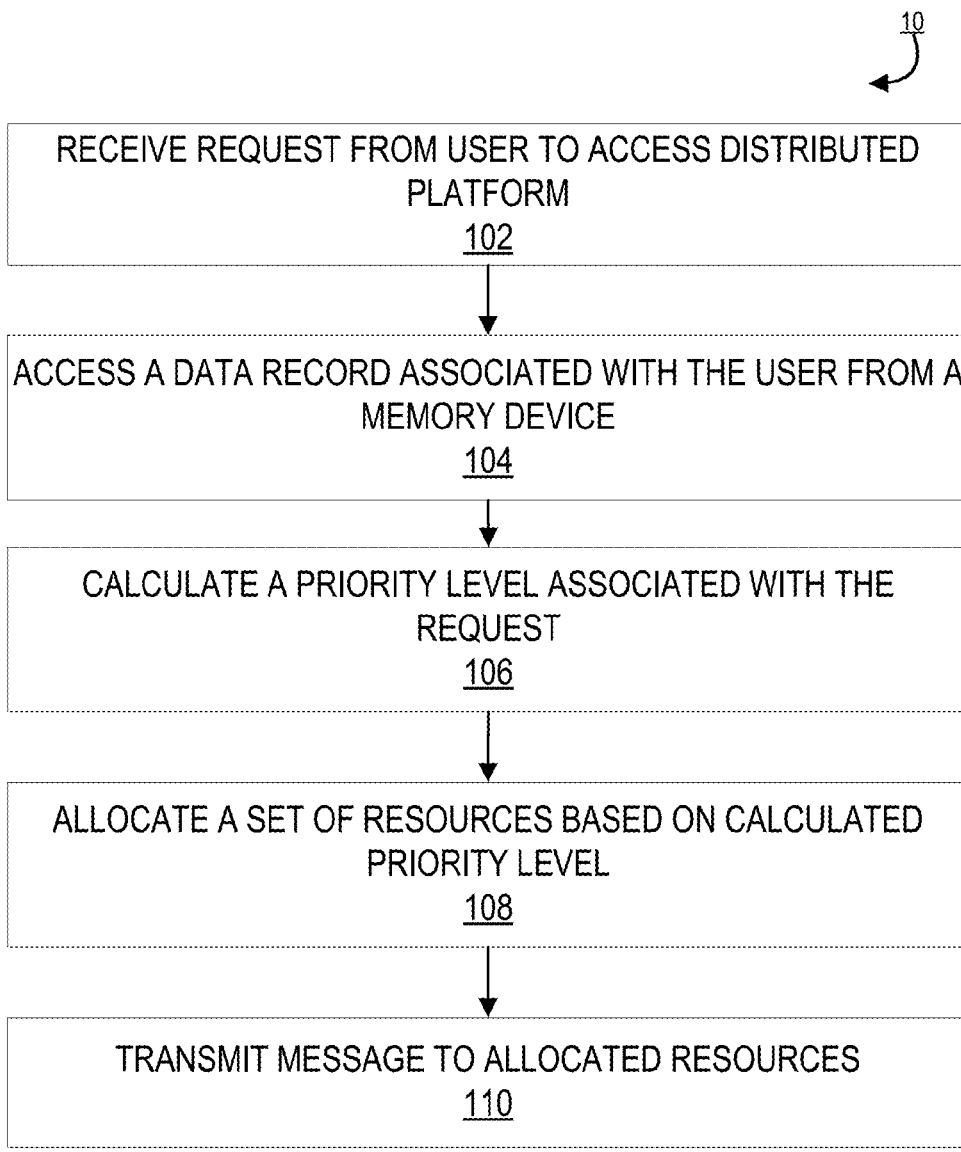

FIG. 2 illustrates a process flow for prioritizing the allocation of resources across a distributed platform in accordance with embodiments of the invention.

Figure 3:
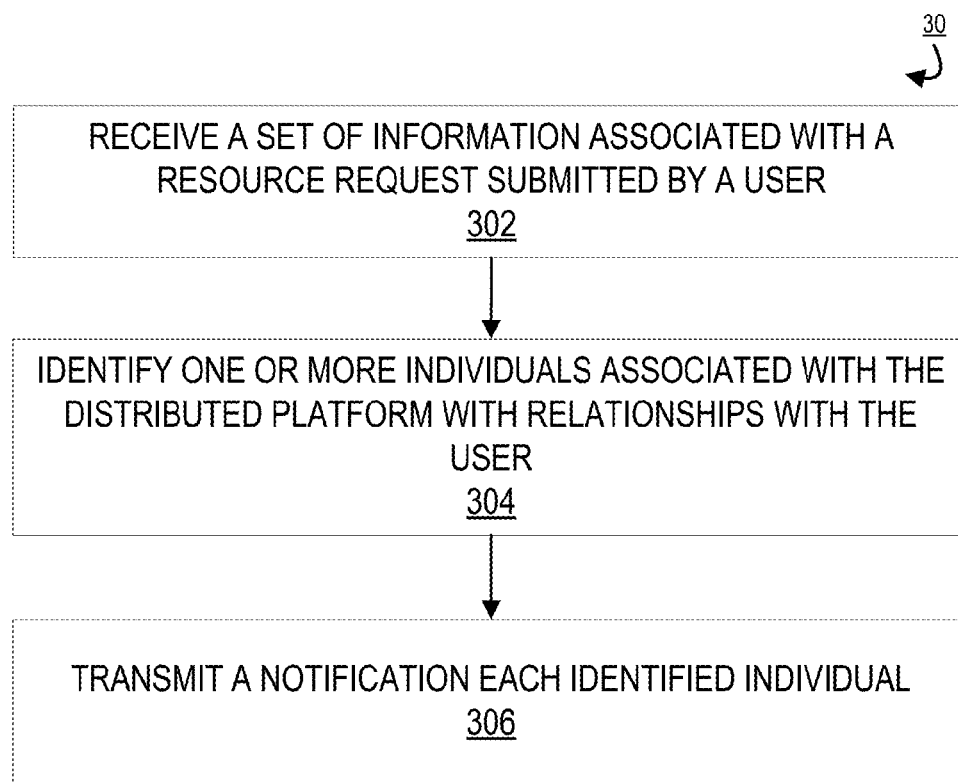

FIG. 3 illustrates a process flow for implementing communications within a distributed platform in accordance with embodiments of the invention.

DETAILED DESCRIPTION OF EMBODIMENTS OF THE INVENTION

Embodiments of the invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

Systems, methods, and computer program products are herein disclosed that provide the ability to prioritize the allocation and deployment of resources across a distributed service platform based on the recognition of one or more traits of a user of that distributed service platform. Although some embodiments of the invention herein are generally described as involving a "financial institution," one of ordinary skill in the art will appreciate that other embodiments of the invention may involve other businesses that take the place of or work in conjunction with the financial institution to perform one or more of the processes or steps described herein as being performed by a financial institution. Still in other embodiments of the invention, the financial institution described herein may be replaced with other types of businesses that may be associated with an event-responsive resource allocation structure.

Some portions of this disclosure are written in terms of a financial institution's unique position with respect to user transactions. As such, a financial institution may be able to utilize its unique position to monitor and identify particularized service needs that arise with respect to transactions and other activities pursued by a customer.

As used herein, the term "distributed service platform" refers to any service platform with more than one point of access from which a user can receive service resources. For example, a restaurant with two waiters can be considered a simplified distributed service platform, in the sense that customers of the restaurant may seek service from either waiter or both waiters at any particular time.

One example of a more complex distributed service platform that is particularly relevant to the present disclosure is the distributed service platform associated with a financial institution. In an example distributed service platform associated with a financial institution, multiple, smaller distributed service platforms are combined into a larger distributed service platform designed to service the conceivable needs of all of the institution's customers. In such an example, a financial institution may operate a plurality of branch locations that are physically located throughout the geographic area in which the financial institution operates. In addition to allowing customers to access the institution's services from any such branch location, the institution may also operate one or more call centers, through which customers can access services via telephone. The institution may also make available to its customers other methods of seeking and acquiring services, such as websites, mobile banking applications, and other electronic means of accessing services offered by the financial institution. In some example situations, the distributed service platform may also include specialized personnel and/or offices designed to further augment and expand the distributed service platform.

Those skilled in the art will appreciate that an example distributed service platform may also be implemented at an individual physical branch location operated by the institution. At such a branch location, for example, there may be a number of service representatives who are primarily responsible for addressing one set of service needs, such as handling deposits, withdrawals, and other routine services. Another individual or set of individuals may be primarily responsible for addressing other sets of service needs, such as opening or closing accounts, fielding inquiries about accounts, discussing and implementing investments and/or other more complex transactions. Yet another individual or set of individuals may be primarily responsible for addressing and resolving extraordinarily complex and/or urgent service issues. As such, within a particular branch location, a customer can be directed to the individual or individuals who are in a position to provide the service resources that are most likely to address the customer's needs.

One of the advantageous characteristics of a distributed service platform is the ability of users of the service platform to access service resources at a broad range of times, locations, and in a way that suits the customer. In the context of a financial institution, a customer may have the option of seeking out information and services in person at any of the institution's branch locations, over the phone, or online via a website or mobile banking application. However, the diversified nature of a distributed service platform presents a significant technical challenge, namely, that of ensuring that sufficient service resources are allocated in a timely manner that satisfies the service needs and expectations of each user of the service platform (and the users in the aggregate), while avoiding redundancy and waste of service resources due to communication disruptions or delays within the distributed service platform.

In the context of a financial institution, this technical challenge is compounded by the non-uniformity of the service expectations of the institution's customers, and the non-static service needs of each individual customer. The service expectations of the institution's customers are non-uniform in at least the sense that each individual customer has an individualized expectation of the level of service resources that should be allocated to that customer for any given service need. For example, one customer may have high expectations regarding the speed with which transactions are processed and questions answered, and demand expedited service, while another customer may have no such expectations, and may be satisfied without expedited service. In another example, one customer may expect frequent, in-person contact by customer service representatives, while another customer may prefer and expect less frequent updates via mail or electronic messaging. Non-uniformities in service expectations across a customer base may also arise from differences in past experiences, preferences, personalities, and the like amongst customers.

The service needs of the institution's customers are non-static in at least the sense that the service needs of a particular customer may change over time. For example, at one point in time, a customer may need to make a routine deposit to an account. At another time, the same customer may seek assistance in obtaining a mortgage or another type of investment product. At yet another time, the same customer may seek assistance in replacing a misplaced or damaged card. A customer's service needs may also change over a longer time horizon, such that the service needs of a customer may vary substantially over weeks, months, or years.

In view of the non-uniform nature of individualized customer expectations, and the non-static nature of customer service needs, an efficient and effective distributed service platform must be able to rapidly identify customer needs and expectations, prioritize the deployment of the available service resources, and adapt to changes in customer needs and expectations.

Large distributed service platforms that are designed to accommodate and address a broad spectrum of service needs are subject to an additional technical challenge, namely, that of ensuring that relevant service data is shared across the platform in a manner that allows for service resources to be efficiently and effectively deployed. In the context of a distributed service platform associated with a financial institution, for example, an individual customer may have a multi-faceted relationship with the institution. For example, a customer may keep personal accounts with the institution, be an authorized user of a business account at the institution, may have a mortgage or other loan with the same institution, and may be associated with investments made through the institution. Information known to one set of service representatives within the service platform may be valuable to other sets of service representatives, and allow them to meet the service needs of the customer in a more effective and efficient way. In another example, a customer may have ongoing service needs, such that information conveyed to one service representative impacts the decision regarding which resources should be directed to the customer at a subsequent point in time. For example, a customer in the process of replacing a misplaced or damaged card may interact with the service platform once to report the issue, and one or more times to confirm resolution of the issue, ask follow-up questions, and/or seek additional support.

Many of the example implementations of solutions to these technical challenges described herein contemplate and refer to tags. As used herein, the term "tag" refers to a set of data and/or metadata that can be assigned to a particular user of a distributed service platform. Those skilled in the art will recognize that tags may be stored as part of one or more data records associated with a platform user, and such data records may be stored in a database, memory device, or other medium from which such data records may be viewed and/or retrieved in connection with addressing the resource needs of a user. In general, the examples disclosed and discuss herein contemplate a tag that is associated with, or indicative of, a trait associated with a user of the service platform and/or that user's service needs. In some example implementations, a tag is used to represent an aspect of a platform user's relationship with the platform. In such examples, a tag may be persistent, and be assigned to a user based on a set of traits regarding the user's relationship with the platform. In these and other examples, a tag or group of tags may be associated with a particular service requirement of the user and/or a potential priority associated with a particular service requirement. In these and other examples, a tag may also be associated with individuals associated with the distributed service platform who are associated with a particular user. In some example implementations, a tag may be implemented as, stored on, represented by, and/or associated with a physical object, such as a card, or pin embedded with a Near Field Communication (NFC) device. In some example implementations a tag may be associated with a mobile application that sends a transmission, such as a transmission via NFC. In some example implementations, including some example implementations in the context of a distributed service platform associated with a financial institution, a branch location or other location associated with the financial institution may have a reader or other detection device that scans, seeks, and/or otherwise receives a signal transmitted by a device associated with a tag or another transmission associated with a tag. Those skilled in the art will appreciate that while a tag can be implemented as a physical object and/or part of a physical object, other implementations of tags, including tags that are represented as data and/or transmissions, are possible.

In an example implementation in the context of a distributed service platform associated with a financial institution, a user may be assigned a set of tags that can be organized into three general categories. In this example, a tag associated with the first category is an indicator of a degree of a relationship between the customer and the institution. The relationship between the customer and the institution may be characterized by a number of traits or factors, including but not limited to the duration of the relationship, the volume of business the customer does or has done with the institution, the type or types of business the customer does or has done with the institution, whether a customer has elected to purchase additional service resources from the institution, and other characteristics of the relationship. In such an example relationship, the tag assigned to the customer may be selected from a set of tags associated with different degrees of the relationship between the customer and the institution, with one tag associated with a very close or highly established relationship with the customer, and a series of other tags associated with decreasingly close relationships between the institution and the customer.

A tag associated with the first category may also identify and/or include information regarding the preferences of a customer. For example, if a customer is not interested in receiving repeated information about certain services, a tag may be associated with the customer that identifies such a preference. Other customer preferences may also be embodied in a tag, including but not limited to preferences regarding how communications with the customer are conducted, and how products and services are provided to the customer. Those skilled in the art will recognize that such tags can be persistent to the customer and/or represent an aggregation of information across lines of business within the institution. For example, a tag associated with an individual may take into account aspects of the entirety of a customer's interactions with an institution, such as interactions done in a personal capacity, in the context of a customer's employment responsibilities, and other interactions between the customer and the institution.

In an example implementation in the context of a distributed service platform associated with a financial institution, a user may be assigned a tag in a second category, which is associated with the type of service need that a customer has at a given point in time. For example, a customer may request to make a routine deposit or withdrawal, a more complex transaction, such as a mortgage or loan, or an unanticipated need for service, such as the need to replace a missing or damaged card. In some such example implementations, and in other example implementations, a tag associated with a perceived degree of a service need may be assigned to the user. For example, a color-coded and/or tiered set of tags may be assigned based on the perceived criticality, time-sensitivity, and/or complexity of the service need. In some example implementations, the perceived degree a criticality, time-sensitivity, and/or complexity of the service need may be dynamically updated over time. For example, if a customer places numerous calls to a call center within a given day or other time interval, it is likely that the customer perceives the service need as critical, and a corresponding tag may be assigned to the customer. Such a tag, in turn, may trigger review by an individual or team of individuals associated with the distributed service platform tasked with reviewing and addressing such potential service needs and, where necessary, escalating the service need to the appropriate resources.

In an example implementation in the context of a distributed service platform associated with a financial institution, a user may be assigned a tag in a third category, which is indicative of other individuals and/or groups of individuals within the distributed service platform with which the customer is associated. For example, tags in this category may identify individuals within the service platform with whom the customer has worked in the past, individuals within the service platform whom are working with the customer on an ongoing basis, and/or individuals who are associated with the customer in other business and/or social contexts. Tags may also be used to identify other individuals associated with a user. In some example implementations that contemplate a customer of a financial institution, a tag may be used to identify a spouse, joint account holder, parent or guardian, child, dependent, agent, representative, or other individual, such that individuals who are empowered or otherwise authorized to conduct business on behalf of a customer and/or acquire information regarding the customer (including but not limited to products and services used by or available to the customer) can be readily identified.

In example implementations, one or more tags or sets of tags may be assigned to or otherwise associated with an individual user or customer based on previously received information or on information received in real-time or near-real-time. Tags may be assigned automatically, through the operation of a processor in communication with one or more databases or memory devices, manually by an individual authorized to do so (such as an employee associated with a service platform, for example) or by the user.

In example implementations, a tag or tags can be used as at least part of the basis for identifying service needs of customers and/or prioritizing the deployment of service platform resources to customer. For example, a tag that indicates that a particular service need is particularly urgent, critical, and/or time-sensitive may be detected by a system associated with the service platform, which in turn would prioritize the deployment of particular service resources to address that service need over service needs that are less urgent or time sensitive. In some example implementations, a tags or tags may be used to identify particular service platform resources that should be directed to a particular customer. For example, a tag may indicate that a particular individual associated with the service platform has been involved with addressing an ongoing service need of a customer. When the customer has a question, concern, or other need associated with that ongoing service need, the individual most familiar with that customer and service need may be assigned to assist. Similarly, individuals associated with a service platform with specialized knowledge or skills may be assigned and deployed to assist customers who are associated with tags that indicate that such specialized knowledge or skills may be particularly helpful. In other such examples, a tag may indicate that a customer has had particularly positive interactions with a particular individuals or group of individuals associated with the service platform, and those individuals may be assigned and deployed to assist that customer whenever possible.

In some example implementations where resources are prioritized and/or allocated at least in part based on the detection and/or processing of tags, tags can be used in a manner that allows for escalation of service issues and reallocation of service resources as service needs change. In some such example implementations, the determination of which resources should be allocated to a particular customer can be performed iteratively and/or at time intervals, including but not limited to time intervals during the providing of services. For example, if, while addressing one service need of a customer, a specialized need arises, specialized resources can be allocated to the customer. In another example, if an interaction between a customer and the individual or individuals assigned to assist the customer shows indicia that the experience or outcome may be unsatisfactory from the perspective of the customer and/or the financial institution, resources can be reallocated to potentially avoid an unsatisfactory outcome.

Tags, and/or the detection of tags, may be used to trigger communications to individuals associated with the service platform at the time a service need arises and/or after a service need has been addressed. For example, a tag may indicate that a customer entering a branch location of a financial institution has a particularly close and/or long-term relationship with the financial institution. Detection of that tag by a system associated with the distributed service platform may cause an e-mail or other electronic message to be sent to the branch manager and/or others at the branch location, who can then greet the customer and/or ensure that the customer has a satisfactory interaction and resolution of their service need. In some example implementations, a tag that indicates that a customer is associated with one or more individuals within the distributed service platform may be detected and used to generate a message after the service need of the customer has been met to provide an update regarding the service need of the customer. For example, an individual within the service platform who primarily assists the customer with a mortgage, investment, or otherwise engages in a series of interactions with the customer may be apprised of the service needs and resolutions of those needs experienced by a customer that may impact the customer's overall impression of the distributed service platform and the products or services offered by the financial institution.

In example implementations where tags are used to trigger communications to individuals associated with the distributed service platform, the information sent to various distributed service platform personnel can be customized and/or targeted based on any of a number of factors. For example, a customer service representative with a relatively close or longitudinal relationship with a customer may be sent a message whenever the customer visits a location associated with that service representative, while an individual associated with the service platform who normally interacts with the customer when the customer is acting in a business capacity may only be apprised of service needs that are associated with that business capacity. In another example, service representatives associated with the distributed service platform who have been actively involved in serving a customer may be apprised of the service needs of a customer that arise over a period of time after the initial interaction between the customer and those service representatives. For example, if a service representative has been primarily responsible for assisting a customer who suffered a lost or damaged card while traveling may be apprised of any service needs that the customer expresses over the following days or weeks, to ensure that any issues that are associated with a replacement card and/or are perceived to be associated with a replacement card are addressed in a satisfactory manner.

Tags may also be used to trigger and/or guide communications with the customer. For example, a tag may indicate that a customer prefers to not receive repeated information about products or services. In some such example implementations, a tag may be associated with the customer indicating that the customer has previously been presented with a set of information, and that repeated questions about such information or re-presentation of the information should be avoided. In some such example implementations, a timing aspect is contemplated, such that an interval of time (such as a month, quarter, year, or other interval) may be allowed to pass before information that has previously been presented to a customer is repeated. In some example implementations where tags are used to trigger and/or guide communications with a customer, one or more tags may be associated with a customer who has experienced a wait time or other service outcome that was deemed unsatisfactory by the customer or the financial institution. Such tag or tags could be used to trigger communication and/or other interaction with the customer aimed at avoiding a similarly unsatisfactory experience or outcome.

In some example implementations, one or more tags may be updated to reflect changes in a user's relationship with the distributed platform and/or a change in resource needs. For example, as a customer's relationship with a financial institution changes over time, the tags associated with that user may be updated to reflect those changes. Similarly, tags that reflect a customer's preferences may be adjusted to reflect changes in those preferences. Moreover, as the customer interacts with the different individuals associated with the service platform, or as the service platform experiences changes in configuration and personnel, tags that are indicative of particularized relationships between the customer and individuals within the distributed service platform may be adjusted to reflect such changes in circumstances. Those skilled in the art will recognize that it may be advantageous to periodically examine, update, and otherwise correct tags associated with a user, such as a customer, to ensure that service resources are not deployed in a manner that reflects outdated or superseded aspects of a customer's preferences and needs.

In some example implementations, tags, as well as the data and other information associated with particular tags may also be used to aide in the identification of potential adjustments to a customer's relationship with an institution associated with a service platform. For example, an individual associated with a distributed service platform may recognize that one or more adjustments to a customers' relationship with the institution may cause the user to be associated with one or more different tags that may cause the user's service needs to be prioritized in a manner more consistent with the customer's interests, preferences, and goals. For example, in the context of a financial institution, a customer service representative may recognize that adding a service or product to the customer's portfolio, reconfiguring the placement of assets, and/or adjusting how the customer uses existing services and products may cause one or more tags associated with the user to be upgraded, such that their service needs would be likely to receive a higher priority and/or the customer may become eligible to receive additional specialized services. Upon recognizing such a situation, or being apprised of such a situation, the customer service representative may be able to make suggestions to the customer regarding such adjustments.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with implementation and modification of event-responsive resource allocation structures.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for the authorization and instant modification of an event-responsive resource allocation structure and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

FIG. 1 illustrates a system environment 200, for use in connection with the prioritized allocation of resources across a distributed platform, such as a distributed service platform. FIG. 1 provides the system environment 200 for which example instances of the elements and/or processes described herein may be implemented. FIG. 1 provides a unique system that includes specialized servers and systems communicably linked across a distributive network that may allow a user, via a user's mobile device, to communicate with systems and servers associated with one or more entities and institutions associated with a distributed service platform and/or the processes described and disclosed herein. The system environment 200 may also provide for the recognition, authorization, and authentication of a user. The system environment 200, with its communicably linked network may, in some embodiments, improve a general computing device if utilized thereon by improving the ability for the computer device to access and securely transmit and/or present information associated with tags associated with a user and/or other aspects of a distributed service platform, particularly with respect to the prioritization of service needs with respect to the platform. Furthermore, in some embodiments, the system may be, as described below, run on a network of specialized nodes meant for implementing a change in the identification of a beneficiary of an event-responsive resource allocation structure.

As illustrated in FIG. 1, the financial institution server 208 is operatively coupled, via a network 201 to the user system 204, and to the network system 206. In this way, the financial institution server 208 can send information to and receive information from the user system 204 and the network system 206 to recognize a customer, receive requests for service needs associated with a customer, and recognize and/or receive tags or indicia of tags from associated with a user upon user device authentication. FIG. 2 illustrates only one example of an embodiment of the system environment 200, and it will be appreciated that in other embodiments one or more of the systems, devices, or servers may be combined into a single system, device, or server, or be made up of multiple systems, devices, or servers.

The network 201 may be a system-specific distributive network receiving and distributing specific network feeds and identifying specific network associated triggers. The network 201 may also be a global area network (GAN), such as the Internet, a wide area network (WAN), a local area network (LAN), or any other type of network or combination of networks. The network 201 may provide for wireline, wireless, or a combination wireline and wireless communication between devices on the network 201.

In some embodiments, the user 202 is an individual customer that is associated with a financial institution, and may experience a need for resources from a distributed service platform associated with the financial institution. In some embodiments, the user 202 may interact with a distributed service platform by entering a branch location, telephonically calling a call center, or utilizing a mobile banking application or otherwise electronically interacting with the distributed service platform using a user system 204.

FIG. 1 also illustrates a user system 204. The user system 204 generally comprises a communication device 212, a processing device 214, and a memory device 216. The user system 204 is a computing system that allows a user 202 to interact with the financial institution and/or other institution to access a distributed service platform to request resources and services associated therewith. The processing device 214 is operatively coupled to the communication device 212 and the memory device 216. The processing device 214 uses the communication device 212 to communicate with the network 201 and other devices on the network 201, such as, but not limited to the network system 206 and the financial institution server 208. As such, the communication device 212 generally comprises a modem, server, or other device for communicating with other devices on the network 201.

The user system 204 comprises computer-readable instructions 220 and data storage 218 stored in the memory device 216, which in one embodiment includes the computer-readable instructions 220 of a user application 222. In this way, a user 202 may interact and with a distributed service platform using the user system 204 via an application operating on the user system 204. Furthermore, the user application 222 may receive a token from the financial institution server 208 or network system 206 and be stored on the memory device 216 of the user system 204. The user system 204 via the user application 222 may decrypt the token to access information required to recognize one or more tags associated with the user, allow the user to interact with the distributed service platform, and/or notify the distributed service platform of a service need. The user system 204 may be, for example, a desktop personal computer, a mobile system, such as a cellular phone, smart phone, personal data assistant (PDA), laptop, or the like. Those skilled in the art will recognize that in some implementations, the user system may take alternate forms or formats, such as that of an NFC, RFID device (including but not limited to an RFID-enabled card containing one or more data elements), a wearable beacon, or any other device capable of signaling a user's presence and/or serving as an indicia of the identity of a user.

As further illustrated in FIG. 1, the financial institution server 208 generally comprises a communication device 246, a processing device 248, and a memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 248 is operatively coupled to the communication device 246 and the memory device 250. The processing device 248 uses the communication device 246 to communicate with the network 201 and other devices on the network 201, such as, but not limited to the network system 206 and the user system 204. As such, the communication device 246 generally comprises a modem, server, or other device for communicating with other devices on the network 201.

As further illustrated in FIG. 1, the financial institution server 208 comprises computer-readable instructions 254 stored in the memory device 250, which in one embodiment includes the computer-readable instructions 254 of a financial institution application 258. In some embodiments, the memory device 250 includes data storage 252 for storing data related to the system environment, but not limited to data created and/or used by the financial institution application 258.

In the embodiment illustrated in FIG. 1 and described throughout much of this specification, the financial institution application 258 may allow for recognizing, creating, adjusting, editing, processing, or otherwise implementing and processing tags, the prioritization and allocation of distributed service platform resources, contact user system 204 for security confidence, and/or push a token to user system 204 for storage and decryption on user system 204 for use in connection with interacting with a distributed service platform associated with the financial institution.

In some embodiments, the financial institution application 258 may allow the creation, implementation, recognition, and/or processing of tags. In some embodiments, the financial institution application 258 may receive a request for distributed service platform resources via the network 201 from the user 202 via the user system 204. The financial institution application 258 may prioritize the request after the request is submitted based on a prioritization criteria stored in the memory 250. In some embodiments, this prioritization by the financial institution application 258 may be instantaneous or near instantaneous upon receiving the request. In some embodiments, a data record that includes one or more tags associated with the user 202 and/or indicia of one or more tags associated with the user 202 may be received from memory 250 and used by the financial institution application 258 in the course of prioritizing a request.

In some embodiments, the financial institution application 258 may present information associated with user 202 to one or more individuals associated with the distributed service platform that is itself associated with the financial institution. As such, once the financial institution application 258 has recognized and assigned a priority to the request from user 202 and assigned service platform resources to address the service resource needs of the user 202, the financial institution application 258 may provide information about the user 202 such as, information about the request for resources associated with the user 202, the tags associated with user 202, and any such other additional information available to financial institution server 208 that may assist the individuals deployed or otherwise assigned to meet the resource request of the user 202. The financial institution application 258 may provide this information via an online banking interface associated with the financial institution server 208 and/or any other interface between the financial institution server and the distributed service platform associated with the financial institution. As such, the financial institution application 258 may provide the individuals associated with the distributed service platform with the information via communication over the network 201 via data feeds and/or other transmissions. Once the user 202 is authenticated, the financial institution application 258 may also provide information to the user 202 about the status of their request for service platform resources via communication over the network 201.

In some embodiments, the financial institution application 258 may receive other information about the user 202, such as preferences and other information associated with current and potential service and resource needs of the user 202, and/or information posted by the user 202 on publicly available sources, or from sources that the user 202 has specifically authorized the one or more institutions to view. As such, the financial institution application 258 may receive network data feeds or communications from the user 202 via a user system 204 over the network 201.

In some embodiments, the financial institution application 258 may determine the unique identity of the user system 204 and/or other devices associated with the request for resources associated with the distributed service platform and contact the devices for security confidence. In some embodiments, the financial institution application 258 may communicate with the user system 204 and/or other systems to identify the user system 204 and/or the user 202. The financial institution application 258 may then initiate a security check on the devices. The security check generates a security confidence rating to confirm that the device requesting change to the event-responsive resource allocation structure is a device associated with the user and is not corrupted with viruses, malware, or the like. As such, the financial institution application 258 communicates and provides codes for download on the user system 204 that maybe encrypted and subsequently decrypted by the user system 204 for system monitoring and malware searching. As such, the security check and subsequently generated security confidence rating ensures that misappropriation of tags and/or unintentional redirection of service platform resources can. As such, the security check may, in some embodiments, provide code and/or access information about the requesting device, based on the identifier of each device. The financial institution application 258 may confirm the operating system of the device, the health of the device, and determine an IP address or location match between the devices the user uses to log into online banking applications and the requesting device. In some embodiments, the financial institution application 258 may generate a security confidence rating based on the security check that rates the security of authorizing the change in the beneficiary of the event-responsive resource allocation structure.

As illustrated in FIG. 2, the network system 206 is connected to the financial institution server 208 and may be associated with individuals and/or entities responsible for implementing and/or operating a distributed service platform associated with the financial institution, or, in other example implementations, an individual or group of individuals qualified provide service resources in response to the request for resources submitted by the user 202. In this way, while only one network system 206 is illustrated in FIG. 1, it is understood that multiple network systems may make up the system environment 200. The network system 206 generally comprises a communication device 236, a processing device 238, and a memory device 240. The network system 206 comprises computer-readable instructions 242 stored in the memory device 240, which in one embodiment includes the computer-readable instructions 242 of a network application 244.

In the embodiment illustrated in FIG. 1, the network application 244 provides, in some embodiments, tag creation, modification, implementation, and distribution. In some embodiments the network application 244 may create and distribute a tag for storage on the user system 204 and financial institution server 208. The tag may include code therein that includes any of the information that may be associated with a tag as discussed or otherwise disclosed herein. As such, the tag or a copy of a tag may be stored in the memory 216 of the user system 204 and subsequently transmitted or otherwise used by the user system 204 as an indicator of the identity and authority of the user 202 to request service resources associated with the distributed service platform and/or contribute to the determination of service resource needs and the prioritization of such needs.

The tag may also be stored and processed by the financial institution system 208 for reconciliation and processing of a request from the user 202 to access resources associated with a distributed service platform.

It is understood that the servers, systems, and devices described herein illustrate one embodiment of the invention. It is further understood that one or more of the servers, systems, and devices can be combined in other embodiments and still function in the same or similar way as the embodiments described herein.

FIG. 2 depicts a process flow 10 for prioritizing the allocation of resources across a distributed platform in accordance with embodiments of the invention. As shown in FIG. 2, and depicted at element 102, process flow 10 may be initiated upon receipt from a user of a request for access to a distributed platform. Example implementations of element 102 may include any of the requests discussed or disclosed herein, or otherwise appreciated by those skilled in the art, including but not limited to requests by a customer associated with a financial institution to receive service resources from a distributed service platform associated with a financial institution. In many examples of process flow 10, included implementation of element 102, the distributed platform may be a distributed service platform, such as a distributed service platform associated with a financial institution.

As depicted in element 104, process flow 10 includes accessing from a memory device a data record associated with the user. In many implementations of element 104, the data record associated with the user will include one or more tags, including but not limited to the tags disclosed herein. In some example implementations of element 104, the data record associated with the user comprises a set of multiple tags associated with the user. For example, a first tag in the set of tags may be is associated with an aspect of the relationship between the user and the distributed platform, such as the length of the relationship between the user and a financial institution associated with the distributed service platform, the degree of closeness of that relationship, the extent products and services offered by the financial institution that are utilized by the user, and any other aspect of the relationship between the user and the distributed platform. A second tag in the set may be associated with an aspect of the request received from the user for access to the distributed platform, such as the nature of the request, the type of service or resources needed, the perceived criticality of the need, information about the time-sensitivity of the need, and/or any other aspect of the request and/or a resource need associated with the request. A third tag may be included in such an example set, wherein the third tag is associated with an identity of an individual associated with the distributed platform, such as a customer service representative with whom the user has an ongoing interaction, professional and/or social relationship, and/or a history of prior interactions. Those skilled in the art will appreciate that any of a number of tags may be included as part of the data record, and such tags need not be amenable to categorization.

As depicted in element 106, process flow 10 includes calculating a priority level associated with the request received from the user. In example implementations of element 106, the calculation of a priority level is based largely on one or more tags associated with the user and/or information associated with those tags. For example, tag associated with a customer of a financial institution may indicate that the customer with a long and very close relationship with the financial institution has a highly time-sensitive, complex, and critical service need, and consequently warrant a high priority in the allocation of resources. Similarly, a set of tags associated with a customer may suggest that the customer prefers to approach a service representative on the customer's own schedule, or has a less-critical service need, and thus may not require a highly prioritized allocation of resources. In some example implementations of element 106, calculating a priority level associated with the request received from the user comprises comparing the set of tags associated with one user to a set of tags associated with one or more other user who have submitted requests for resources from a service platform. For example, a number of customers may enter a branch location of a bank, and a comparison of the tags associated with the customer may be used to prioritize how service resources could be best allocated to meet the service needs of the customers in an efficient manner. In many example implementations, the calculation of a priority level will be accomplished by a processor executing an application, such as the financial institution application 258 or network application 244 discussed in the context of FIG. 1. Those skilled in the art will appreciate, however, that calculation of a priority level associated with a request for resources may be accomplished in accordance with any of a number of protocols, algorithms, and/or processes based on the details of the specific implementation, the specific details of a distributed service platform, and/or the typical resource and/or service needs of customers of institutions associated with distributed service platforms.

As depicted in element 108, process flow 10 includes allocating a first set of resources associated with the distributed platform to the user based at least in part on the calculated priority level. In example implementations of element 108 that occur in the context of a distributed service platform, the allocation of resources may include the assignment of one or more individuals associated with the distributed service platform to the service and/or resource need of a customer. For example, in situations where the resource need of a customer implicates specialized knowledge or training, an individual associated with the distributed service platform with such knowledge and training may be assigned to assist that particular customer.

As depicted in element 110, process flow 10 includes transmitting a message associated with the user to the first set of resources associated with the distributed platform. In example implementations in the context of a financial institution and a distributed service platform associated with that financial institution, the individual or group of individuals assigned to assist a particular customer may be sent by one or more systems or servers associated with the distributed service platform a communication and/or data feed that includes the tags associated with the user, information about the service need of the customer, information about the priority of that need, and/or any information that is implicated by the tags and/or is likely to otherwise assist in the efficient satisfaction of the customer's service need. In some such example implementations, the message may include an indication of the identity of the user and a message associated with the data record to the first individual. In some example implementations of element 110, one or more additional messages associated with the user may be transmitted to other individuals associated with the distributed service platform. For example, individuals responsible for meeting ongoing or recurring service needs of a particular customer may receive messages regarding the customer's request for service resources.

FIG. 3 illustrates a process flow 30 for implementing communications within a distributed platform in accordance with embodiments of the invention. Some example implementations of process flow 30 arise in the context a distributed service platform, such as a distributed service platform associated with a financial institution, and contemplate the use of tags that identify relationships between a customer and one or more individuals associated with the distributed service platform.

As depicted in element 302, process flow 30 includes receiving a set of information associated with a resource request submitted by a user. In some example implementations of element 302 that arise in the context of a distributed service platform associated with a financial institution, the set of information may be a customer's request for service, and may further include details about the request for service, such as the date, time, and location of the request, facts and details associated with the request, the identity of the individual or individuals who assisted the customer, a report on the perceived outcome of the interaction, and any other details that may be relevant to assessing whether the customer's service needs were properly met. In some implementations of element 302, the information may be received in an electronic format and transmitted to and processed by one or more servers, such as the financial institution server 208 and/or the network system 206 described in connection with FIG. 1.

As depicted in element 304, process flow 30 comprises identifying one or more individuals associated with the distributed platform who have relationships with the user. In example implementations of element 304, identifying such individuals is accomplished by recognizing and processing tags that identify such individuals. For example, a customer service representative who routinely assists a customer at a particular branch location may be identified in a tag associated with that customer. In another example, an individual associated with a financial institution who works with a customer in a professional and/or business capacity may be identified in a tag associated with the customer. In yet another example, individuals associated with other service needs of the customer, such as investment consultants, account representatives, and others, may be identified in tags associated with the customer.

As depicted in element 306, process flow 30 comprises transmitting a notification to each identified individual. In some example implementations of element 306, the individuals identified in element 304 may receive email messages and/or other electronic messages that contain the set of information discussed with respect to element 302 and/or a subset of that information. Those skilled in the art will appreciate that a notification sent to an individual may be customized to that individual and the relationship between that individual and the customer. For example, a customer service representative who primarily interacts with the customer in the customer's capacity and a representative of the customer's employer may receive a notification that includes limited information about a resource request from the customer that is directed to the customer's personal resource needs. In another example, a customer service representative that has an ongoing relationship with the customer may receive a highly detailed report if there was a perceived unsatisfactory outcome to a customer's service need.

For the purposes of explanation, and without limitation, the following examples implement several aspects of the invention:

Explanatory Example 1

An individual enters a branch location associated with a financial institution. A system at the branch location receives a signal transmitted by an NFC or by an application running on the individual's smartphone that includes tags and/or indicia of tags associated with the user. Upon processing the signal, the system recognizes that the tags associated with the individual indicate that the individual is an individual who has conducted extensive business in both a personal and business capacity with the financial institution, but typically visits a different branch location and normally interacts with a particular bank employee. The system causes an alert to be sent to the screen of the branch manager, including an identification of the individual, a listing of the tags, details regarding the individual's service preferences, and an indication that the individual should be offered highly prioritize service. Consequently, the bank manager is able to greet the individual in the branch, invite the individual to the manager's office and provide a level of service that impresses the individual and allows the financial institution to maintain a continuity of service standards with respect to the customer. While the branch manager is addressing the service needs of the individual, a message is sent to the individual's typical service representative containing near-realtime updates on the status of the individual's service needs, such that the typical representative can be on-call should a particularized need arise.

Explanatory Example #2

A couple working on securing a mortgage and has interacted with a specialized customer service representative over a period of time in connection with completing the mortgage process. On an unrelated matter, one member of the couple contacts a call center associated with the same financial institution to resolve a question involving an account statement. During the call, a tag associated with customer is detected that indicates that the specialized customer service representative has been working with the couple. A system associated with the financial institution causes a message to be sent to the specialized customer service representative, who subsequently contacts the couple with an update regarding the status of the mortgage process.

Explanatory Example #3

While on vacation, a customer of a financial institution misplaces a plastic card associated with the financial institution. The customer contacts the financial institution via a hotline and has a positive interaction with a particular representative who is able to quickly provide the customer with a replacement card. Upon return from vacation, the customer experiences some difficulties in updating various automatic payments that were linked to the misplaced card. Upon contacting the financial institution, a tag associated with the customer identifies the customer service representative who assisted the customer in replacing the card. That customer service representative is then put in contact with the customer to further assist the customer, as the customer is comfortable with the particular representative and the representative is familiar with the underlying details surrounding the replaced card.

Explanatory Example #4

A customer enters a branch location to conduct a routine deposit. While assisting the customer with the deposit, a system associated with the financial institution causes the tags associated with the customer to be displayed on the monitor of the customer service representative, along with an indication that the customer would be assigned a tag that is associated with expedited processing of transactions if the customer added an additional service to the customer's portfolio of services at the financial institution. Upon completion of the transaction, the customer service representative is able to discuss the potential upgrade with the customer and/or direct the customer to another customer service representative who is able to discuss further details.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention maybe practiced other than as specifically described herein.

What is claimed is:

1. A system for allocating resources across a distributed platform, the system comprising:
    a Near Field Communication (NFC) device having a first memory and a first processing device operatively coupled to the first memory device, wherein first processing device is configured to execute computer-readable program code to:
        communicate, via NFC, a plurality of user-specific tags stored in the first memory, wherein the tags include a first tag storing data associated with an aspect of a relationship between a user and a distributed platform and a second tag storing data associated with an aspect of a request received from the user for access to the distributed platform;
    a computing platform having a second memory device and a second processing device operatively coupled to the second memory device, wherein the second processing device is configured to execute computer-readable program code to:
        receive, from the user, the request for access to the distributed platform;
        receive, from the NFC device, the plurality of user-specific tags;
        calculate a priority level associated with the request by comparing data in the plurality of user-specific tags to data from other user-specific-tags associated with other users currently requesting access to the distributed platform;
        allocate a first set of resources associated with the distributed platform to the user based at least in part on the calculated priority level; and
        transmit a first message associated with the user to the first set of resources associated with the distributed platform.

2. The system of claim 1 wherein the distributed platform is a distributed service platform, and wherein the first set of resources associated with the distributed platform comprises a first individual associated with the distributed service platform.

3. The system of claim 2 wherein the plurality of user-specific tags further comprise a third tag storing data associated with an identity of a second individual associated with the distributed service platform.

4. The system of claim 3 wherein transmitting a first message associated with the user to the first set of resources associated with the distributed platform comprises transmitting an indication of the identity of the user and a message associated with the data record to the first individual.

5. The system of claim 3 wherein the processing device is further configured to execute computer-readable program code to transmit a second message associated with the user to the second individual associated with the distributed service platform.

6. A computer program product for allocating resources across a distributed platform, the computer program product comprising at least one non-transitory computer-readable medium having computer-readable code portions embodied therein, the computer readable program code portions comprising:
    an executable portion configured to receive from a user a request for access to the distributed platform;
    an executable portion configured to receive, via Near Field Communication (NFC), a plurality of user-specific tags, wherein the tags include a first tag storing data associated with an aspect of a relationship between a user and a distributed platform and a second tag storing data associated with an aspect of the request received from the user for access to the distributed platform;
    an executable portion configured to calculate a priority level associated with the request received by comparing data stored in the plurality of user-specific tags to data stored in other user-specific-tags associated with other users currently requesting access to the distributed platform;
    an executable portion configured to allocate a first set of resources associated with the distributed platform to the user based at least in part on the calculated priority level; and
    an executable portion configured to transmit a first message associated with the user to the first set of resources associated with the distributed platform.

7. The computer program product of claim 6 wherein the distributed platform is a distributed service platform, and wherein the first set of resources associated with the distributed platform comprises a first individual associated with the distributed service platform.

8. The computer program product of claim 7 wherein the plurality of user-specific tags further comprise a third tag storing data associated with an identity of a second individual associated with the distributed service platform.

9. The computer program product of claim 8 wherein transmitting a first message associated with the user to the first set of resources associated with the distributed platform comprises transmitting an indication of the identity of the user and a message associated with the data record to the first individual.

10. The computer program product of claim 9 further comprising an executable portion configured to transmit a second message associated with the user to the second individual associated with the distributed service platform.

11. A method for allocating resources across a distributed platform, the method comprising:
    receiving from a user a request for access to the distributed platform;
    receive, via Near Field Communication (NFC), a plurality of user-specific tags, wherein the tags include a first tag storing data associated with an aspect of a relationship between a user and a distributed platform and a second tag storing data associated with an aspect of the request received from the user for access to the distributed platform;

calculating by a processing device a priority level associated with the request received by comparing data in the plurality of user-specific tags to data from other user-specific-tags associated with other users currently requesting access to the distributed platform;

allocating a first set of resources associated with the distributed platform to the user based at least in part on the calculated priority level; and transmitting a first message associated with the user to the first set of resources associated with the distributed platform.

12. The method of claim 11, wherein the distributed platform is a distributed service platform, and wherein the first set of resources associated with the distributed platform comprises a first individual associated with the distributed service platform.

13. The method of claim 12, wherein the plurality of user-specific tags further comprise a third tag storing data associated with an identity of a second individual associated with the distributed service platform.

14. The method of claim 13 wherein transmitting a first message associated with the user to the first set of resources associated with the distributed platform comprises transmitting an indication of the identity of the user and a message associated with the data record to the first individual and wherein the method further comprises transmitting a second message associated with the user to the second individual associated with the distributed service platform.

* * * * *